(12) United States Patent
Biegert et al.

(10) Patent No.: US 10,768,028 B2
(45) Date of Patent: Sep. 8, 2020

(54) SENSOR UNIT FOR DETERMINING A ROTOR POSITION OF AN ELECTRIC MOTOR AND ELECTRIC MOTOR, PREFERABLY FOR A CLUTCH ACTUATOR OF A CLUTCH ACTUATION SYSTEM OF A MOTOR VEHICLE

(71) Applicant: Schaeffler Technologies AG & Co. KG, Herzogenaurach (DE)

(72) Inventors: Peter Biegert, Gengenbach (DE); Dominik Holl, Buhl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/507,890

(22) PCT Filed: Sep. 15, 2015

(86) PCT No.: PCT/DE2015/200458
§ 371 (c)(1),
(2) Date: Mar. 1, 2017

(87) PCT Pub. No.: WO2016/041556
PCT Pub. Date: Mar. 24, 2016

(65) Prior Publication Data
US 2017/0261352 A1 Sep. 14, 2017

(30) Foreign Application Priority Data
Sep. 16, 2014 (DE) .......................... 10 2014 218 544

(51) Int. Cl.
*F16D 28/00* (2006.01)
*G01D 5/14* (2006.01)
(Continued)

(52) U.S. Cl.
CPC ........... *G01D 11/245* (2013.01); *G01D 5/145* (2013.01); *F16D 28/00* (2013.01);
(Continued)

(58) Field of Classification Search
CPC ................. G01D 11/245; G01D 5/145; F16D 2500/302; F16D 28/00; F16D 2500/5122; G01L 19/143
See application file for complete search history.

(56) References Cited

U.S. PATENT DOCUMENTS 4,959,574 A 9/1990 Suzuki et al.
5,581,179 A * 12/1996 Engel ..................... G01D 5/147
324/207.2
(Continued)

FOREIGN PATENT DOCUMENTS

CN 1856711 A 11/2006
CN 101558285 A 10/2009
(Continued)

*Primary Examiner* — Akm Zakaria
(74) *Attorney, Agent, or Firm* — Volpe and Koenig, P.C.

(57) ABSTRACT

The invention relates to a sensor unit for determining a rotor position of an electric motor, including at least one magnetic field sensor attached to a carrier element. In the case of a sensor unit, in which the sensor system can be easily exchanged, the carrier element is positioned in a sensor system housing which is open on one side and in which a sensing area of the at least one magnetic field sensor is directed in the direction of the open side of the sensor system housing.

10 Claims, 3 Drawing Sheets

(51) Int. Cl.
*G01D 11/24* (2006.01)
*G01L 3/10* (2006.01)

(52) U.S. Cl.
CPC ............... *F16D 2500/302* (2013.01); *F16D 2500/5122* (2013.01); *G01L 3/102* (2013.01)

(56) References Cited

U.S. PATENT DOCUMENTS

| | | | |
|---|---|---|---|
| 7,230,356 B2 | 6/2007 | Kimura et al. | |
| 8,657,095 B2 | 2/2014 | Eich | |
| 2002/0135497 A1* | 9/2002 | Kimura | G01D 5/145 340/870.31 |
| 2006/0176050 A1 | 8/2006 | LaPlaca | |
| 2007/0063693 A1 | 3/2007 | Modest | |
| 2010/0109654 A1 | 5/2010 | Schneider et al. | |
| 2011/0187351 A1 | 8/2011 | Hunger | |
| 2013/0099107 A1* | 4/2013 | Omoto | F16C 41/007 250/231.13 |
| 2013/0200884 A1* | 8/2013 | Manabe | G01D 5/2046 324/207.16 |
| 2014/0046617 A1 | 2/2014 | Campagna | |
| 2014/0176130 A1 | 6/2014 | Bueno Palacios | |
| 2015/0303857 A1* | 10/2015 | Burke | H02K 11/33 318/496 |

FOREIGN PATENT DOCUMENTS

| | | |
|---|---|---|
| CN | 102141371 A | 8/2011 |
| CN | 102713527 A | 10/2012 |
| CN | 203011394 U | 6/2013 |
| CN | 203364843 U | 12/2013 |
| DE | 19620548 | 12/1996 |
| DE | 102011014936 | 12/2011 |
| DE | 102011081222 | 2/2013 |
| DE | 102013208986 | 12/2013 |
| DE | 102012213948 | 2/2014 |
| DE | 102013213948 A1 | 2/2014 |
| DE | 112012001896 | 4/2014 |
| EP | 1729093 | 12/2006 |
| JP | H 1-299415 A | 12/1989 |
| JP | H 6-34391 A | 2/1994 |
| JP | H9-145733 A | 6/1997 |
| JP | 2000-180460 A | 6/2000 |
| JP | 2000-321093 A | 11/2000 |
| JP | 2005-295673 A | 10/2005 |

* cited by examiner

SENSOR UNIT FOR DETERMINING A ROTOR POSITION OF AN ELECTRIC MOTOR AND ELECTRIC MOTOR, PREFERABLY FOR A CLUTCH ACTUATOR OF A CLUTCH ACTUATION SYSTEM OF A MOTOR VEHICLE

BACKGROUND

The invention relates to a sensor unit for determining a rotor position of an electric motor, comprising at least one magnetic field sensor, which is positioned on a carrier element, as well as an electric motor, preferably for a clutch actuator of a clutch actuating system of a motor vehicle.

Increasingly automatic clutches are used in modern motor vehicles, particularly passenger vehicles, as described in DE 10 2011 014 936 A1. The use of such clutches has the advantage of improved driving comfort and leads to the option that more frequently driving can occur in gears with long transmission ratios. The clutches used here are inserted in hydraulic clutch systems, in which a hydrostatic actuator driven by an electrically commutated motor is driven, connected via a hydraulic line to the clutch.

In order to improve driving comfort in a vehicle, the position of the rotor of the electric motor measured by a sensor unit must be compared to the desired position of the rotor of the electric motor. Usually the rotor position is detected by three magnetic field sensors in the form of Hall-sensors, switched offset in reference to each other. The flanks provided by the magnetic field sensors are used as a position signal.

An electric motor is known from DE 10 2013 213 948 A1 in which the magnetic field sensors are arranged at the stator, outside the axis of rotation of the electric motor. The three magnetic field sensors and perhaps also other similar sensors are positioned on a circuit board and detect the magnetic field of a magnetic master circuit, which is connected torque-proof to the rotor of the electric motor running at the outside (DE 10 2013 208 986 A1).

The circuit board with the magnetic field sensors is commonly installed fixed between the stator and a carrier of the stator, which prevents exchanging of the circuit board with the sensors after the completed assembly of the stator. Furthermore, the sealing of the carrier of the sensors represents another problem, because bore holes are required for contacting and connecting the sensors using screws. These bore holes lead to a reduction of the stiffness of the actuator housing in which the electric motor is positioned.

SUMMARY

The invention is therefore based on the objective to provide a position for the circuit board carrying the magnetic field sensors, in which it can easily be fastened and simultaneously any reductions of stiffness of the actuator housing are prevented.

According to the invention the objective is attained in a sensor unit, in which the carrier element is positioned in a sensor housing which is designed open at one side and with a sensing area of at least one magnetic field sensor pointing in the direction of the side of the sensor housing designed in an open fashion. With such a separate sensor unit, even after the assembly of the stator, the sensors can be easily exchanged such that in case of any malfunction the sensors can be easily handled. The stiffness of the actuator housing remains unchanged.

Advantageously the carrier element is embodied as a circuit board or as a leadframe. In particular the application as a leadframe reduces the weight of the sensor unit and allows a space-saving arrangement of the magnetic field sensors on the carrier element.

In one embodiment at least one magnetic field sensor jointly with the carrier element is molded or injection molded with a synthetic material in a sensor housing. By this coating with a synthetic, without any additional components, a reliable fastening of the sensors on the carrier element and simultaneously in reference to the sensor housing is ensured such that vibrations acting upon the sensor housing during movements of the motor vehicle have no consequences for the positioning of the sensors. Furthermore, the sensors located inside the sensor housing are reliably protected from environmental influences, such as moisture.

In one variant, wiring of the carrier element and/or the magnetic field sensors is guided in a cable outlet leading from the sensor housing away towards the outside, with the cable outlet preferably being filled with a synthetic material. Here too, a locally fixed positioning of the wiring is ensured by the synthetic material. Simultaneously, the cable outlet pointing away to the outside can be used for the precise alignment of the sensors in reference to the magnetic master circuit. Depending on the structural space available the cable outlet can be guided away radially or tangentially from the sensor housing.

In one variant the sensor housing has a step in its axial extension by which the sensor housing is divided into portions with two cross-sections. This step particularly serves the purpose to correctly adjust the distance of the sensing areas of the magnetic field sensors from the magnetic master circuit such that the magnetic field generated by the magnetic master circuit can be reliably detected by the magnetic field sensors.

Advantageously the sensor housing is embodied in a cylindrical fashion and has at its external circumference at least one gasket. By the cylindrical embodiment the cylinder housing can easily be adjusted to the shape of the rotor housing. The gasket positioned at the external circumference leads to the fact that after the insertion of the sensor housing into the rotor housing here a sealing effect develops such that the inserted sensors are not compromised by environmental influences.

In another embodiment the carrier element is equipped at both sides with magnetic field sensors and/or an evaluation and/or amplification electronic. Equipping the carrier element at both sides is advantageously possible when the sensor housing is designed as a cylinder. Mounting the magnetic field sensors at both sides allows therefore redundancy of the signals determined by the magnetic field sensors.

Another variant of the invention relates to an electric motor, particularly for a clutch actuator of a clutch actuating system of a motor vehicle, comprising a rotor which is connected in a torque proof fashion to a magnetic master circuit and a stator at which at least one magnetic field sensor is arranged for the detection of a magnetic field stretched by the magnetic master circuit, with the magnetic field sensor being arranged outside the axis of rotation of the rotor. In an electric motor, in which the sensor can easily be exchanged, at least one magnetic field sensor is arranged in a sensor unit, which is embodied according to at least one of the features explained in this patent application.

The sensor unit is advantageously arranged at the stator, with an open side of a sensor housing facing the magnetic master circuit. This way it is ensured that the magnetic field sensors reliably sense the magnetic field stretched by the magnetic master circuit and allow issuing a respectively precise sensor signal.

In one variant the sensor housing can be plugged onto the rotor housing. This way the rotor housing can be assembled and disassembled in a particularly simple fashion.

BRIEF DESCRIPTION OF THE DRAWINGS

The invention allows numerous embodiments. In the following one of them shall be explained based on the figures shown in the drawing.

Shown are.

DETAILED DESCRIPTION OF THE PREFERRED EMBODIMENTS

Figure 1:
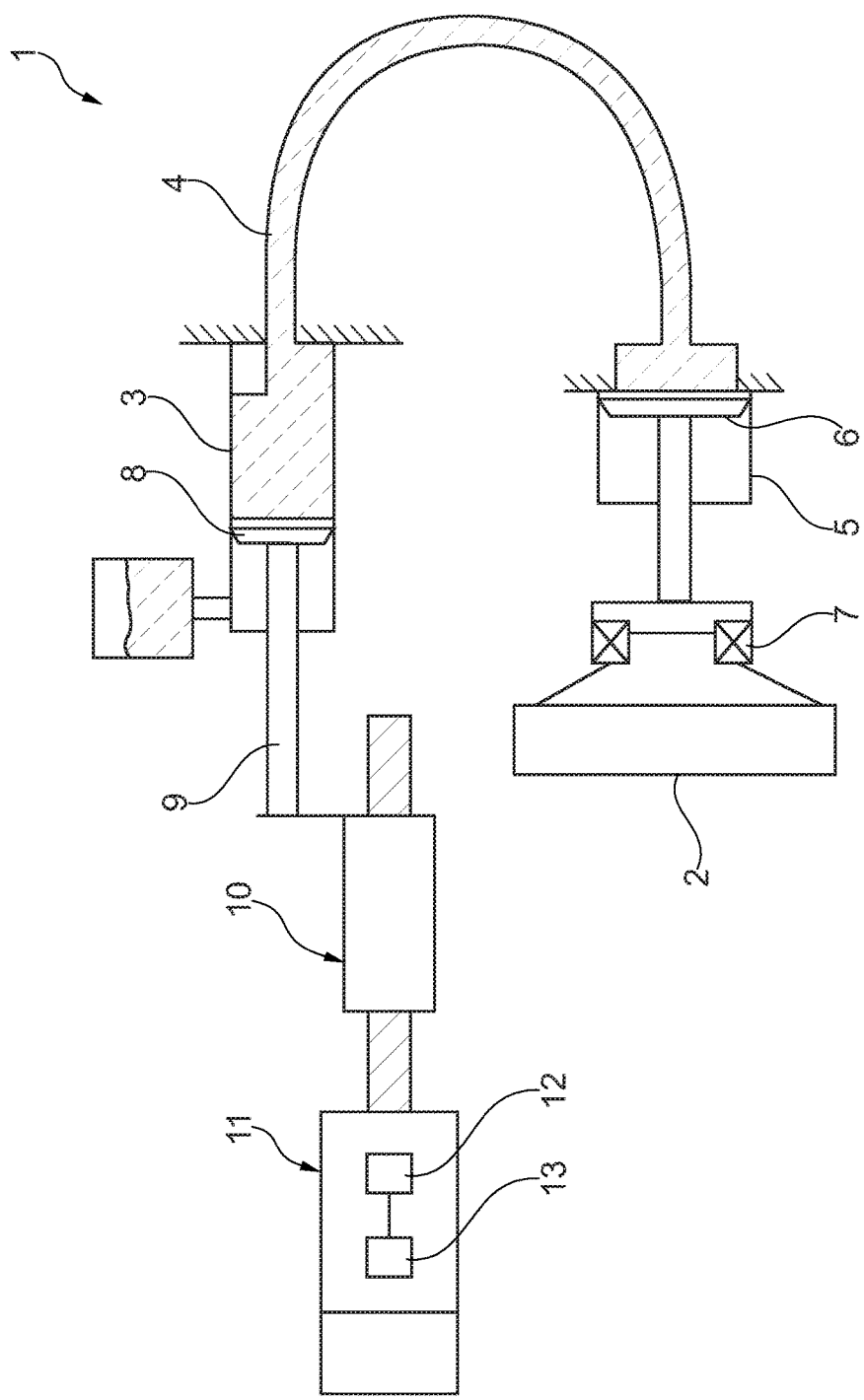
FIG. 1 an illustration of the principle of a clutch actuating system for actuating an automated friction clutch.

FIG. 1 shows a clutch actuating system 1 for an automatic clutch in a simplified fashion. The clutch actuating system 1 is allocated to a friction clutch 2 in a drivetrain of a motor vehicle and comprises a master cylinder 3, connected via a hydraulic line 4, also called pressure line, to a slave cylinder 5. A slave piston 6 is supported in an axially mobile fashion in the slave cylinder 5, which actuates the friction clutch 2 with a bearing 7 being positioned therebetween. A master piston 8 is positioned in an axially mobile fashion in the master cylinder 3. A piston rod 9 extends from the master piston 8, which in the longitudinal extension of the master cylinder 3 can be translationally moved together with the master piston 8. The piston rod 8 of the master cylinder 3 is coupled via a threaded spindle 10 to an electromotive actuating drive 11. The electromotive actuating drive 11 comprises an electric motor 12 embodied as a commutated direct-current motor and an evaluation unit 13. The threaded spindle 10 converts here a rotary motion of the electric motor 12 into a longitudinal motion of the piston rod 9 and/or the master piston 8.

Figure 2:
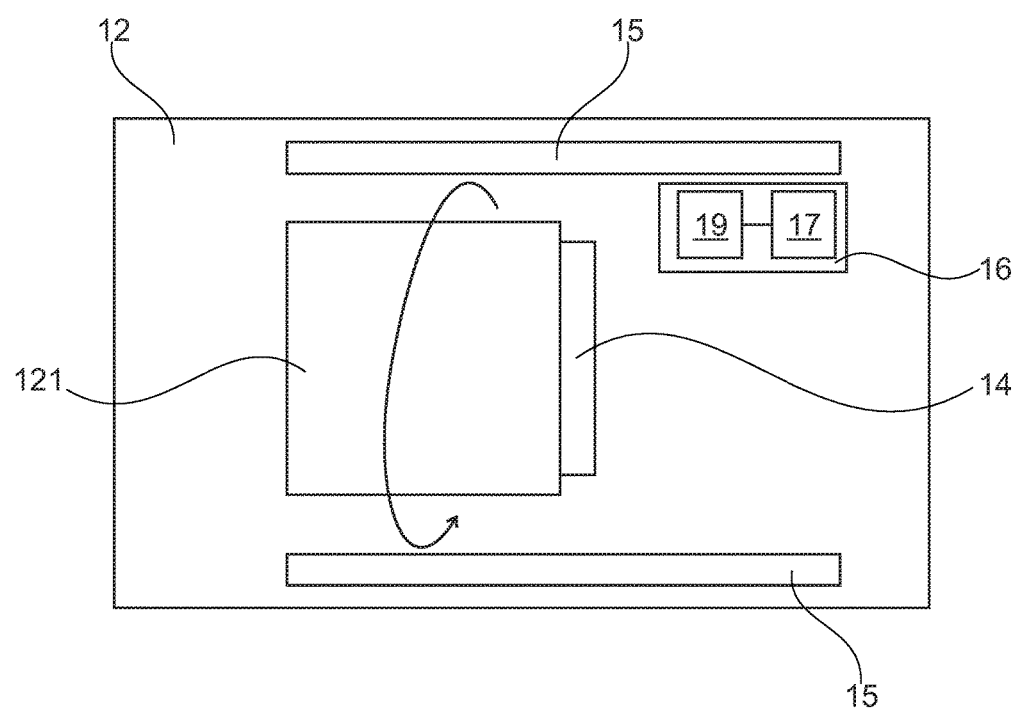
FIG. 2 an exemplary embodiment of an electric motor according to the invention.

According to FIG. 2 the electric motor 12 comprises a rotor 121, with a magnetic master circuit or magnet 14 being fastened thereto in a torque-proof fashion. At a spatial distance from the magnetic master circuit or magnet 14, outside the axis of rotation of the rotor 121, a sensor unit 16 is fastened at a stator 15, with the positioning signal detected by a magnetic field sensor 19 being assessed by an electronic evaluation unit 17, which is a component of the sensor unit 16.

Figure 3:
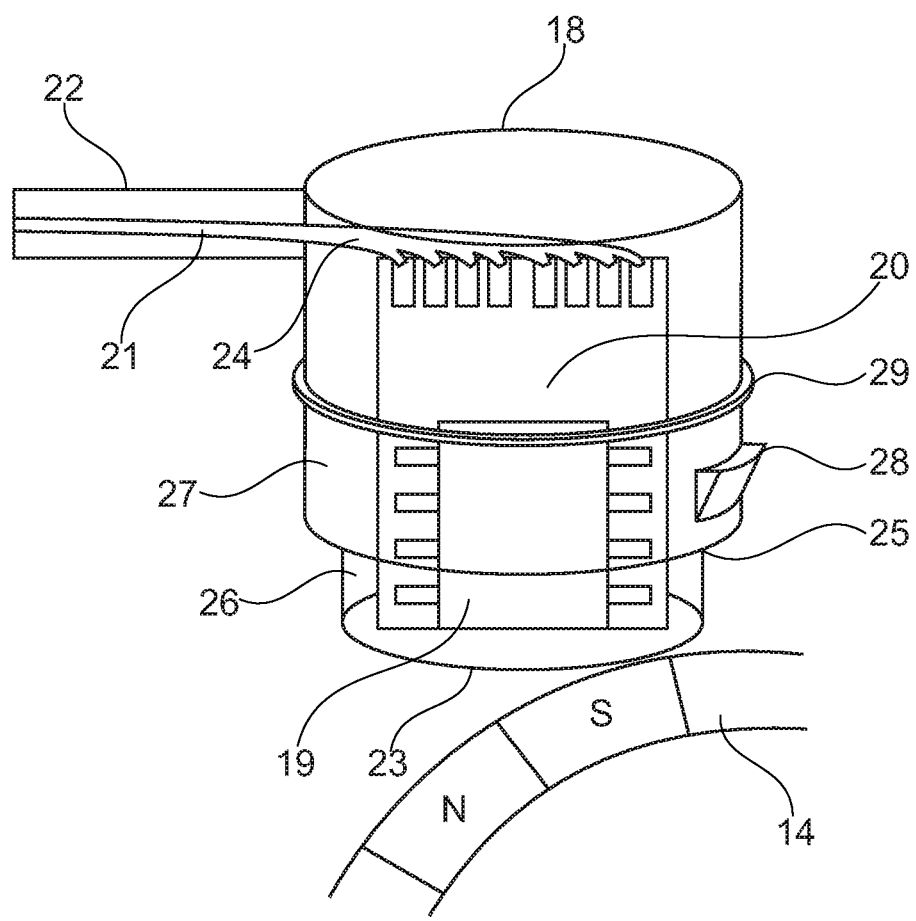
FIG. 3 an exemplary embodiment of the sensor unit according to the invention.

An exemplary embodiment of the sensor unit 16 is shown in FIG. 3. The sensor unit 16 comprises here a cylindrical sensor housing 18, in which at least one magnetic field sensor 19 is positioned on a carrier element 20. The carrier element 20 can here be formed as a planar circuit board or a leadframe. The sensing area of at least one magnetic field sensor 19 points here to a side 23 of the sensor housing 18 that is embodied in an open fashion, which in the installed state faces the magnetic master circuit or magnet 14.

Starting at the carrier element 20, wiring 21 of the circuit board and/or the leadframe is guided in a cable outlet 22 towards the outside, with the cable outlet 22 pointing radially away from the sensor housing 18 or being formed tangentially thereat. The interior chamber of the sensor housing 18 and also the cable outlet 22 are injection molded with a synthetic, so that the interior electronic in the form of the magnetic field sensor 19 and the evaluation electronic 17 as well as the electric lines 24 are sufficiently protected from moisture and simultaneously positioned fixed inside the sensor unit 16.

The cylindrical sensor housing 18 comprises here a stop 25, which divides the sensor housing 18 into two sections 26, 27, with the section 26 encompassing the open side 23 of the sensor housing 18 showing a smaller diameter than the abutting second section 27. This step 25 defines in the geometry of the sensor housing 18 the distance of the open side 23 from the sensing area of the magnetic field sensors 19 to be detected. Furthermore, the section 27 of the sensor housing 18 with the larger diameter shows a locking mechanism 28, by which the sensor housing 18 is held in a housing of the rotor 121, not shown in greater detail, when it is positioned behind the stator 15. Simultaneously, this second section 27 is surrounded by a gasket 29 in the form of an O-ring, which seals the area of the housing of the electric motor 12 towards the inserted sensor unit 16.

Due to the cylindrical form the carrier element 20 can be equipped at both sides. For example, magnetic field sensors 19 can be arranged at both sides in order to allow redundancy of the magnetic field detected. Furthermore, the magnetic field sensors 19 can also be fastened at one side of the carrier element 20, while the other side of the carrier element 20 carries the evaluation and/or amplification circuit 17. Various sensor types, such as Switch-Hall sensors, analog-Hall sensors, 2D/3D-Hall sensors, inductive sensor types, or GMR-sensors may be used as magnetic field sensors 19.

LIST OF REFERENCE CHARACTERS

1 Clutch actuating system
2 Friction clutch
3 Master cylinder
4 Hydraulic line
5 Slave cylinder
6 Slave piston
7 Bearing
8 Master piston
9 Piston rod
10 Threaded spindle
11 Electromotive actuator drive
12 Electric motor/121 Rotor
13 Evaluation unit
14 Magnetic master circuit
15 Stator
16 Sensor unit
17 Evaluation electronic
18 Sensor housing
19 Magnetic field sensor
20 Carrier element
21 Wiring
22 Cable outlet
23 Open side of the sensor housing
24 Electric line
25 Step
26 First section of the sensor housing
27 Second section of the sensor housing
28 Lock
29 Gasket

The invention claimed is:

1. An electric motor assembly comprising:
a sensor unit for determining a rotor position of an electric motor, the sensor unit including:
at least one magnetic field sensor, which is fastened on a carrier element,
the carrier element is positioned in a sensor housing, the sensor housing having a cylindrical profile, the sensor housing being open at one side and the at least one magnetic field sensor is positioned inside of the sensor housing and in a direction of the one side of the sensor housing that is open,
the sensor housing has a step in an axial direction thereof by which the sensor housing is divided into two portions with two-cross sections having different outer diameters and the at least one magnetic field sensor is partially arranged in both of the two portions, wherein a circumferential surface of the sensor housing includes a protruding locking mechanism,
a rotor, which is directly connected to a magnet, and
a stator, at which the at least one magnetic field sensor is arranged for detecting a magnetic field extending from the magnet outside an axis of rotation of the rotor.

2. The electric motor assembly according to claim 1, wherein the sensor unit is arranged at the stator, with an open side of the sensor housing facing the magnet.

3. The electric motor assembly according to claim 1, wherein the sensor housing is pluggable onto a housing of the rotor.

4. The electric motor assembly according to claim 1, wherein the electric motor is part of a clutch actuating system for a motor vehicle.

5. The electric motor assembly according to claim 1, wherein the sensor housing tapers to a smaller diameter in the direction of the one side of the sensor housing that is open.

6. The electric motor assembly according to claim 1, wherein the carrier element comprises a circuit board or as a leadframe.

7. The electric motor assembly according to claim 6, wherein the carrier element is molded or injection molded with a synthetic material in the sensor housing.

8. The electric motor assembly according to claim 1, wherein at least one of wiring of the carrier element or wiring of the at least one magnetic field sensor are guided in a cable outlet, which projects from the sensor housing, with the cable outlet being filled with a synthetic material.

9. The electric motor assembly according to claim 1, wherein the sensor housing has at an exterior circumference thereof at least one gasket.

10. The electric motor assembly according to claim 1, wherein the carrier element is equipped at both sides with at least one of the at least one magnetic field sensor or an electronic evaluation unit or an amplification electronics.

* * * * *